Nov. 4, 1958 J. G. ANDERSON 2,859,303
ELECTRIC RELAY DEVICE
Filed Sept. 12, 1956
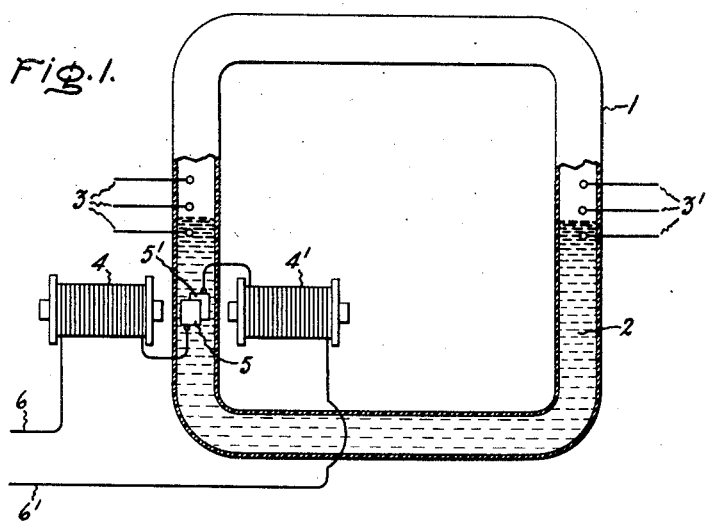
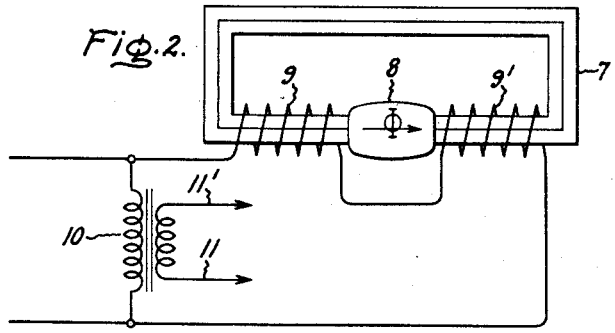
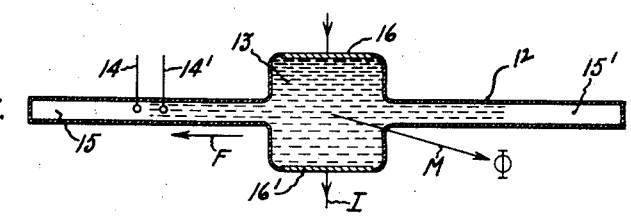
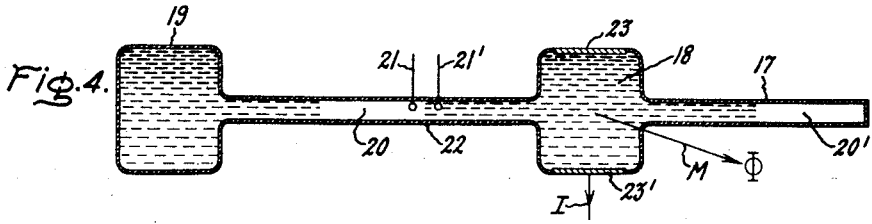
Inventor:
John G. Anderson,
by Gilbert P. Tarleton
His Attorney.

United States Patent Office 2,859,303
Patented Nov. 4, 1958

2,859,303

ELECTRIC RELAY DEVICE

John G. Anderson, Pittsfield, Mass., assignor to General Electric Company, a corporation of New York Application September 12, 1956, Serial No. 609,485

3 Claims. (Cl. 200—112)

The present invention relates to electrical relay devices, and more particularly to a current-sensitive relay device of magnetic type.

While various types of relay devices are presently used in industrial applications, they generally include a moving iron armature attracted by the magnetic field of an electromagnet or solenoid. As such, they require an arrangement of springs, bearings, and other mechanisms which both complicate the construction and add to the cost. In addition, those relays which are designed so that the armature deflection is proportional to voltage or current applied to the relay (such as voltage-sensitive relays now used in induction voltage regulators) must be delicately balanced and handled with care.

It is an object of the present invention to provide an electrical relay device of the above type which avoids the disadvantages of prior known relay switches.

It is another object of the invention to provide an electric relay which has a minimum of parts, is extremely sensitive to changes in current and voltage, and can be used as a control relay or a differential relay.

It is a further object of the invention to provide an electromagnetic relay of the above type which can operate both on alternating current and direct current.

It is still another object of the invention to provide a magnetic relay of the above type which automatically compensates for variations in temperature.

Further objects and advantages will become apparent from the following description and appended claims.

With the above objects in view, the electric relay device of the present invention comprises in its broad aspects the combination of a conduit having a conductive fluid therein, magnetic means for producing a magnetic flux through the conductive fluid in the conduit, electrodes on the conduit for conducting electrical current through the conductive fluid across the magnetic flux, whereby the conductive fluid may be moved along the conduit upon passage of current across the magnetic flux, and contact means associated with the conduit adapted to be contacted by the conductive fluid upon movement of the latter along the conduit.

In a preferred embodiment of the present invention, the means for providing the magnetic flux across the conductive fluid is an electromagnet energized by a coil which also supplies the current passing through the conductive fluid, whereby the device is enabled to operate both on alternating current and direct current. Other modifications of the device as hereinafter more fully disclosed provide for increased sensitivity and for compensation of the device for variations in temperature.

The invention will be better understood from the following description taken in conjunction with the accompanying drawing, in which:

Fig. 1 is a diagrammatic view of an embodiment of the present invention;

Fig. 2 diagrammatically illustrates a modification of the present invention for providing increased sensitivity;

Fig. 3 is a diagrammatic view of a further modification of the device for increasing the sensitivity by different means; and Fig. 4 is still another embodiment of the present invention which automatically compensates for variation in temperature.

Referring now to the drawing, and particularly to Fig. 1, there is shown a ring-shaped conduit 1 made of insulating material such as a synthetic resin or other suitable material and containing a conductive liquid 2, such as mercury or other liquid metal, normally occupying a U-shaped portion of the conduit. Arranged on opposite legs of conduit 1 are contact groups 3 and 3', each group comprising a plurality of spaced electrical contact members which may be connected to any type of desired electrical apparatus (not shown) adapted to be actuated by the present relay device. While a plurality of contacts is shown for each leg of the conduit, it will be obvious that, if desired, only a single pair of contacts need be provided on the conduit so disposed relative to each other and to the mercury that movement of the mercury body as herein described may provide or interrupt a conducting path between the contacts, thus actuating or stopping the operation of the apparatus connected by the contacts to the relay.

Electromagnets 4, 4' are spaced on opposite sides of conduit 1, the coils of the electromagnets being so wound, as is readily understood, that when energized from a current source through leads 6 and 6', their poles adjacent the conduit are of opposite polarity and produce therebetween a magnetic flux passing through the conduit and the mercury therein. Electrodes 5, 5' are mounted in conduit 1 in contact with the mercury and arranged facing each other along a direction generally normal to the magnetic field produced across the conduit by electromagnets 4, 4'.

When the electromagnets 4, 4' and electrodes 5, 5' are energized, the arrangement thus described and shown will produce a force on the conductive liquid 2 at right angles to both the current between the electrodes 5, 5' and the magnetic flux, and in accordance with well-known principles will thereby cause the liquid levels in the respective vertical tubes to either rise or fall according to the polarity of current and method of connection.

This force is produced in the same manner as the force on any current-carrying conductor in a magnetic field and is given by the relationship:

$$F=BIl$$

where $F$ = force
$B$ = magnetic flux density
$l$ = length of current path

Since the flux density B is also proportional to current, the force on the liquid will be proportional to the square of the current through the relay. In the embodiment shown in Fig. 1, this force is eventually balanced by the increased weight of the mercury in the vertical conduit tube. By arranging contacts 3, 3' at desired points along the conduit, the displacement of the liquid can open or close the contacts as desired, and, as will be apparent, a wide variation of contact combinations is possible. The arrangement may obviously be such that when the magnetic and current components are energized, the displacement of the mercury may either establish or remove a conductive path between the contacts.

As shown in the Fig. 1 embodiment, the conduit or vessel 1 containing the conductive liquid is in the form of a closed circle, thereby providing a simple hermetic seal which will prevent contamination and leakage of the liquid. However, other suitably shaped conduits, such as U-shaped or endless conduits other than the illustrated annular type may be employed, if desired.

While only one actuating means is shown in Fig. 1, additional magnets and electrodes may be provided at various places around tube 1, as, for example, to enable control from more than one current source. When arranged in a substantially horizontal plane, the closed circle design of Fig. 1 lends itself for use as an intermittently operating relay wherein the body of conductive liquid 2 may move continuously around the circuit alternately opening and closing the contacts placed in a predetermined arrangement around the annular conduit.

By virtue of the electromagnet arrangement shown in Fig. 1, wherein the coil-energizing current also passes between electrodes 5, 5', the device will operate on either alternating current or direct current, since the force exerted on the mercury body will remain in the same direction on both half cycles of an alternating current wave. However, if desired, separate current sources may be applied to the electrodes 5, 5' and electromagnets 4, 4', or a single electromagnet or permanent magnet may be used instead of the double electromagnet arrangement shown, or any other equivalent arrangement can be employed.

In order to increase the sensitivity of the device, it may be modified to provide for higher current through the mercury body. Fig. 2 diagrammatically shows a circuit arrangement whereby this may be achieved. In the illustrated form, the electromagnet comprises an iron core 7 and coils 9 and 9' arranged on opposite sides of conduit 8 in a manner similar to the Fig. 1 embodiment, the coil leads being connected to a suitable source of current. Connected across the field coil is a transformer 10 arranged with its primary winding connected to the coil leads and with the leads 11, 11' from its secondary winding connected to the electrodes on conduit 8, whereby the current supplied to the electrodes may be substantially increased.

Fig. 3 illustrates a further embodiment of the device which serves to increase its sensitivity by another means. This device comprises a tube 12 having a central chamber containing mercury 13 and provided with current electrodes 16, 16' in contact therewith. The respective arrows show the direction of current I, the magnetic flux M, and the consequent force F on the mercury. Control contacts 14, 14' are suitably spaced along tube 12 in relation to the end of the mercury column so as to be opened or closed in accordance with the movement of the mercury, as described previously. The opposite ends of tube 12 are sealed, with spaces 15, 15' being provided at the extremities of the tube which are filled with a suitable gas adapted to be compressed and expanded by the alternate movements of the mercury body. The gas serves to hold the mercury within predetermined limits in the tube for any particular force applied thereto, but the extent of movement of the mercury is increased by having the mercury compress and expand a small gas space instead of lifting a mercury head, as in the Fig. 1 embodiment, and the sensitivity is accordingly increased over the latter arrangement.

By using low gas pressure in the gas spaces 15, 15' shown in the sealed tubes, the mercury requires only very little force to expand a considerable distance along one of the tubes. If current and an electromagnetic field are impressed on the mercury reservoir 13 as shown, the mercury will move out along one of the tubes and withdraw in the other. This compresses one gas space and evacuates the other, creating a low restoring force tending to force the mercury back toward the center. This force can be made much less than that required to lift a mercury head the same distance. This force will be a function of both the pressure and volume of the tubes, and the less this restoring force, the greater the sensitivity.

Maximum sensitivity will be reached when the restoring force is reduced until it just overcomes the frictional forces in the mercury tube. In the event there is a tendency for the mercury column to oscillate somewhat as the restoring force is reduced, this effect can be damped out by employing a suitable baffle arrangement (not shown) in the mercury reservoir 13.

Fig. 4 shows a further modification of the device which provides for temperature compensation, an additional advantage which is of importance where the device must operate properly over a wide temperature range. In the illustrated embodiment, the device comprises a tubular vessel 17 having a mercury reservoir 18, current electrodes 23, 23', control contacts 21, 21' and gas spaces 20, 20', substantially as described in connection with the Fig. 3 arrangement. In addition, vessel 17 is formed at one end with a temperature compensation chamber 19 filled with mercury as shown. If the compensation chamber 19 and mercury reservoir 18 are maintained at the same temperature, as temperature increases the mercury in both reservoirs will expand out through the tubes. The greater compression of the gas space in the left hand tube due to expansion of the mercury in reservoir 18 is compensated exactly by the compression afforded due to expansion of the mercury in the compensating chamber 19. Accordingly, the mercury boundary at point 22 will remain stationary as the temperature changes, and the switching action of the device is not affected by such changes. It will be understood that such temperature compensation can be provided by the use of a different liquid in the compensation chamber which may have thermal expansion properties similar to those of the conductive liquid used in the main reservoir.

There is thus provided in accordance with the invention a simple, reliable and sensitive relay device which operates without moving mechanical parts or other components subject to operational wear or breakage, and which is extremely versatile in its application to a variety of electrical apparatus.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electric relay device comprising, in combination, conduit means having opposite ends and partially filled with a conductive liquid body movable along said conduit means, said conductive liquid body defining said conduit means at said ends chamber means containing a gaseous medium being compressible and expandable in accordance with the movements of said conductive liquid body along said conduit means; means for providing a magnetic flux in said movable conductive liquid body; means for passing an electric current through said conductive liquid body transverse said conduit means and said magnetic flux; and electrical contact means associated with said conduit means adapted to be contacted by said conductive liquid body, said conductive liquid moving along said conduit means for establishing and interrupting a conductive path through said electrical contact means in accordance with the energization of said magnetic flux means and said current passing means.

2. An electric relay device comprising, in combination, conduit means having opposite ends and partially filled with a conductive liquid movable along said conduit means, said conduit means having chambers at its opposite ends filled with a gaseous medium and arranged on opposite sides of said conductive liquid in the path of movement thereof, the gaseous medium in said chambers being compressible and expandable in accordance with the movements of said conductive liquid; means for providing a magnetic flux in said movable conductive liquid; means for passing an electric current through said conductive liquid transverse said conduit means and said magnetic flux; and electrical contact means associated with said conduit means adapted to be contacted by said conductive liquid during movement thereof.

3. An electric relay device comprising, in combination, conduit means having opposite ends and partially filled with a main conductive liquid body intermediate its ends and an auxiliary liquid body at one end separated from said main conductive liquid body by a gaseous medium, said liquid bodies being of similar thermal expansion properties; means for providing a magnetic flux in said main conductive liquid body; means for passing an electric current through said main conductive liquid body transverse said conduit means and said magnetic flux; and electrical contact means associated with said conduit means adapted to be contacted by said main conductive liquid body, whereby said main liquid body is adapted to be moved along said conduit means in accordance with the energization of said magnetic flux means and said current passing means, into contact with said electrical contact means and whereby its movement is compensated for variations in temperature.

References Cited in the file of this patent

UNITED STATES PATENTS

| | | |
|---|---|---|
| 1,773,936 | Fitzgerald | Aug. 12, 1930 |
| 2,158,009 | Hufnagel | May 9, 1939 |
| 2,566,369 | Putman | Sept. 4, 1951 |
| 2,611,057 | Slonneger | Sept. 16, 1952 |

UNITED STATES PATENT OFFICE
CERTIFICATE OF CORRECTION

Patent No. 2,859,303                                                     November 4, 1958

John G. Anderson

It is hereby certified that error appears in the printed specification of the above numbered patent requiring correction and that the said Letters Patent should read as corrected below.

Column 4, line 54, after "defining" insert -- with --; line 56, after "medium" insert -- adjacent said conductive liquid body, said gaseous medium --; line 64, after "liquid" insert -- body --.

Signed and sealed this 10th day of March 1959.

(SEAL)
Attest:

KARL H. AXLINE                                                    ROBERT C. WATSON

Attesting Officer                                            Commissioner of Patents